(12) United States Patent
Choi

(10) Patent No.: US 9,544,100 B2
(45) Date of Patent: Jan. 10, 2017

(54) TECHNIQUES TO STOP TRANSMISSION OF DATA BASED ON RECEPTION OF AN ACKNOWLEDGMENT WITHIN A SPECIFIED TIME

(71) Applicant: INTEL CORPORATION, Santa Clara, CA (US)

(72) Inventor: Yang-Seok Choi, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 105 days.

(21) Appl. No.: 14/129,089

(22) PCT Filed: Jun. 5, 2013

(86) PCT No.: PCT/US2013/044212
§ 371 (c)(1),
(2) Date: Dec. 23, 2013

(87) PCT Pub. No.: WO2014/196968
PCT Pub. Date: Dec. 11, 2014

(65) Prior Publication Data
US 2014/0362838 A1  Dec. 11, 2014

(51) Int. Cl.
*H04L 1/14* (2006.01)
*H04L 12/741* (2013.01)
*H04L 1/18* (2006.01)
*H04L 1/16* (2006.01)

(52) U.S. Cl.
CPC .............. *H04L 1/188* (2013.01); *H04L 1/1657* (2013.01); *H04L 1/1664* (2013.01)

(58) Field of Classification Search
CPC ....... H04L 1/1657; H04L 1/188; H04L 1/1644
See application file for complete search history.

(56) References Cited

U.S. PATENT DOCUMENTS

| 7,649,911 B2 | 1/2010 | Moreton |
| 7,965,632 B2 | 6/2011 | Sugaya |
| 2004/0076176 A1* | 4/2004 | Kfir ......................... H04J 3/085 370/465 |

(Continued)

OTHER PUBLICATIONS

Xiao et al. Throughput and Delay Limits of IEEE 802.11. IEEE Communications Letters, vol. 6, No. 8 [online], Aug. 2002 [retrieved on May 5, 2016]. Retrieved from the Internet:<URL: https://www.google.com/url?paf=&q=http://edge.cs.drexel.edu/regli/Classes/CS680/Papers/802.11/01025570.pdf &usg=AFQjCNGmxhardDkeXVLg6DngKVpdqbvjMQ><DOI: 10.1109/LCOMM.2>.*

(Continued)

*Primary Examiner* — Omar Ghowrwal

(57) ABSTRACT

Examples are disclosed for simultaneous transmitting and receiving packets in a wireless local access network (WLAN). In some examples, a source node in the WLAN may transmit a packet to a destination node in the WLAN and may receive an implicit acknowledgement (ACK) packet from the destination node. The source node may stop transmitting a remaining portion of the packet if the implicit ACK packet is not received within a defined time interval or if a dummy/packet payload for the implicit ACK packet is not successfully decoded. Also, the destination node may or may not include a data payload in an implicit ACK packet sent responsive to receiving the packet from the source node. Other examples are described and claimed.

18 Claims, 11 Drawing Sheets

(56) References Cited

U.S. PATENT DOCUMENTS

| | | | | |
|---|---|---|---|---|
| 2005/0226239 | A1* | 10/2005 | Nishida | H04L 1/1874 370/389 |
| 2007/0060167 | A1* | 3/2007 | Damnjanovic | H04W 52/24 455/450 |
| 2010/0165869 | A1 | 7/2010 | Jia et al. | |
| 2011/0128973 | A1 | 6/2011 | Yonge, III et al. | |
| 2012/0281699 | A1 | 11/2012 | Jia et al. | |

OTHER PUBLICATIONS

International Search Report and Written Opinion received for PCT Patent Application No. PCT/US2013/044212, mailed Feb. 28, 2014, 13 pages.

"6th Generation Intel® Core™ i3 Processors, The PC Performance Bar Has Been Raised", Product specifications and comparisons, 9 pages, retrieved Apr. 20, 2016, (Author unknown).

"6th Generation Intel® Core™ i5 Processors, Boost Performance Where You Need It", Product specifications and comparisons, 10 pages, retrieved Apr. 20, 2016, (Author unknown).

"6th Generation Intel® Core™ i7 Processors, Unleash Your Imagination. Explore the Possibilities", Product specifications and comparisons, 9 pages, retrieved Apr. 20, 2016, (Author unknown).

"Part 11: Wireless LAN Medium Access Control (MAC) and Physical Layer (PHY) Specifications Amendment 3: Enhancements for Very High Throughput in the 60 GHz Band", IEEE Std 802.11ad-2012, (2012), 628 pages, (author unknown).

"Hotspot 2.0 (Release 1) Technical Specification Version 1.0.0", Wi-Fi Alliance® Technical Committee Hotspot 2.0 Technical Task Group, (2012), 25 pages, (author unknown).

"AMD Athlon Processors, The performance you need at the price you want", Product information, 2 pages, (author unknown).

"AMD—Family 15h Models 00h-0Fh AMD FX-Series Processor Product Data Sheet", AMD publication #49686, Rev. 3.01, Oct. 2012, 6 pages, (author unknown).

"Intel Core 2 Duo Processor E4300", Product information, 3 pages, (author unknown).

"Part 11: Wireless LAN Medium Access Control (MAC) and Physical Layer (PHY) specifications Amendment 7: Interworking with External Networks", Draft Standard for Information Technology-Telecommunications and information exchange between systems—Local and metropolitan area networks Specific requirements, IEEE P802.11u™/D13.0, (2010), 218 pages, (author unknown).

"Intel Celeron Processors, Intel Level Performance at a Great Value", Product information, 13 pages, (author unknown).

"Intel Pentium Processors, Impressive Performance for Work and Play", Product information, 8 pages, (author unknown).

"Hotspot 2.0 (Release 1) Technical Specification Version 1.0.0", Wi-Fi Alliance® Technical Committee Hotspot 2.0. Technical Task Group, (2012), 25 pages, (author unknown).

"Compare Intel Products" E4300, Product information, 3 pages, (author unknown).

"Part 11: Wireless LAN Medium Access Control (MAC) and Physical Layer (PHY) specifications Amendment 7: Interworking with External Networks", Draft Standard for Information Technology—Telecommunications and information exchange between systems—Local and metropolitan area networks Specific requirements, IEEE P802.11u™/D13.0, (2010), 218 pages, (author unknown).

"Compare Intel Products" D1540, Product information, 4 pages, (author unknown).

Part 11: Wireless LAN Medium Access Control (MAC) and Physical Layer (PHY) specifications Amendment 7: Interworking with External Networks, , IEEE P80211u™/D13.0, (2012), 2793 pages, (author unknown).

* cited by examiner

600

*TRANSMITTING, AT A SOURCE NODE IN A WLAN, A PACKET HAVING A FIRST HEADER AND A FIRST DATA PAYLOAD TO A DESTINATION NODE IN THE WLAN*
*602*

*CONTINUING TO TRANSMIT THE FIRST DATA PAYLOAD TO THE DESTINATION NODE BASED ON WHETHER AT LEAST A SECOND HEADER FOR AN IMPLICIT ACK PACKET HAS BEEN RECEIVED FROM THE DESTINATION NODE TO INDICATE RECEIPT OF AT LEAST THE FIRST HEADER BY THE DESTINATION NODE*
*604*

*STOPPING TRANSMISSION OF A REMAINING PORTION OF THE FIRST DATA PAYLOAD AWAITING TRANSMISSION IF THE SECOND HEADER FOR THE IMPLICIT ACK PACKET HAS NOT BEEN RECEIVED WITHIN A DEFINED TIME INTERVAL*
*606*

*FIG. 6*

Storage Medium 700

*Computer Executable Instructions for 600*

RECEIVING, AT THE DESTINATION NODE FOR A WLAN, A PACKET INCLUDING A FIRST HEADER AND A FIRST DATA PAYLOAD FROM A SOURCE NODE IN THE WLAN
902

GENERATING AN IMPLICIT ACK PACKET HAVING A SECOND HEADER, THE IMPLICIT ACK PACKET ALSO INCLUDING EITHER A DUMMY PAYLOAD IF NO DATA IS AWAITING TRANSMISSION TO THE SOURCE NODE OR A SECOND DATA PAYLOAD IF DATA IS AWAITING TRANSMISSION TO THE SOURCE NODE
904

TRANSMITTING THE IMPLICIT ACK PACKET TO THE SOURCE NODE FOLLOWING SUCCESSFUL DECODING OF THE FIRST HEADER AND CONCURRENT WITH RECEIVING AND DECODING THE FIRST DATA PAYLOAD INCLUDED IN THE PACKET RECEIVED FROM THE SOURCE NODE
906

DETERMINING THAT DATA HAS BECOME AVAILABLE AFTER AT LEAST A FIRST PORTION OF THE DUMMY PAYLOAD HAS BEEN TRANSMITTED
908

REPLACING A SECOND PORTION OF THE DUMMY PAYLOAD AWAITING TRANSMISSION WITH A THIRD HEADER ASSOCIATED WITH THE AVAILABLE DATA AND A THIRD DATA PAYLOAD INCLUDING AT LEAST SOME OF THE AVAILABLE DATA
910

TRANSMITTING THE SECOND PORTION TO THE SOURCE NODE
912

*FIG. 9*

Storage Medium 1000

*Computer Executable Instructions for 900*

*FIG. 10*

TECHNIQUES TO STOP TRANSMISSION OF DATA BASED ON RECEPTION OF AN ACKNOWLEDGMENT WITHIN A SPECIFIED TIME

TECHNICAL FIELD

Examples described herein are generally related to transmitting and receiving packets in a wireless local access network.

BACKGROUND

A hidden node issue may be a possible cause of collisions or signal degradation in wireless local access networks (WLANs) that are capable of implementing packet transmitting schemes such as carrier sense multiple access (CSMA). Transmitting schemes such as CSMA may attempt to avoid nodes concurrently transmitting packets over a same wireless communication channel. For example, each respective node may sense whether another node is currently using the same wireless communication channel to transmit a packet and withhold transmitting packets until the other node's transmission can no longer be sensed. As a result of withholding transmission while the other node transmits, collisions and/or signal degradation may be reduced or eliminated.

BRIEF DESCRIPTION OF THE DRAWINGS

FIG. 6 illustrates an example of a first logic flow.

FIG. 7 illustrates an example of a first storage medium.

FIG. 9 illustrates an example of a second logic flow.

FIG. 10 illustrates an example of a second storage medium.

DETAILED DESCRIPTION

Figure 1:
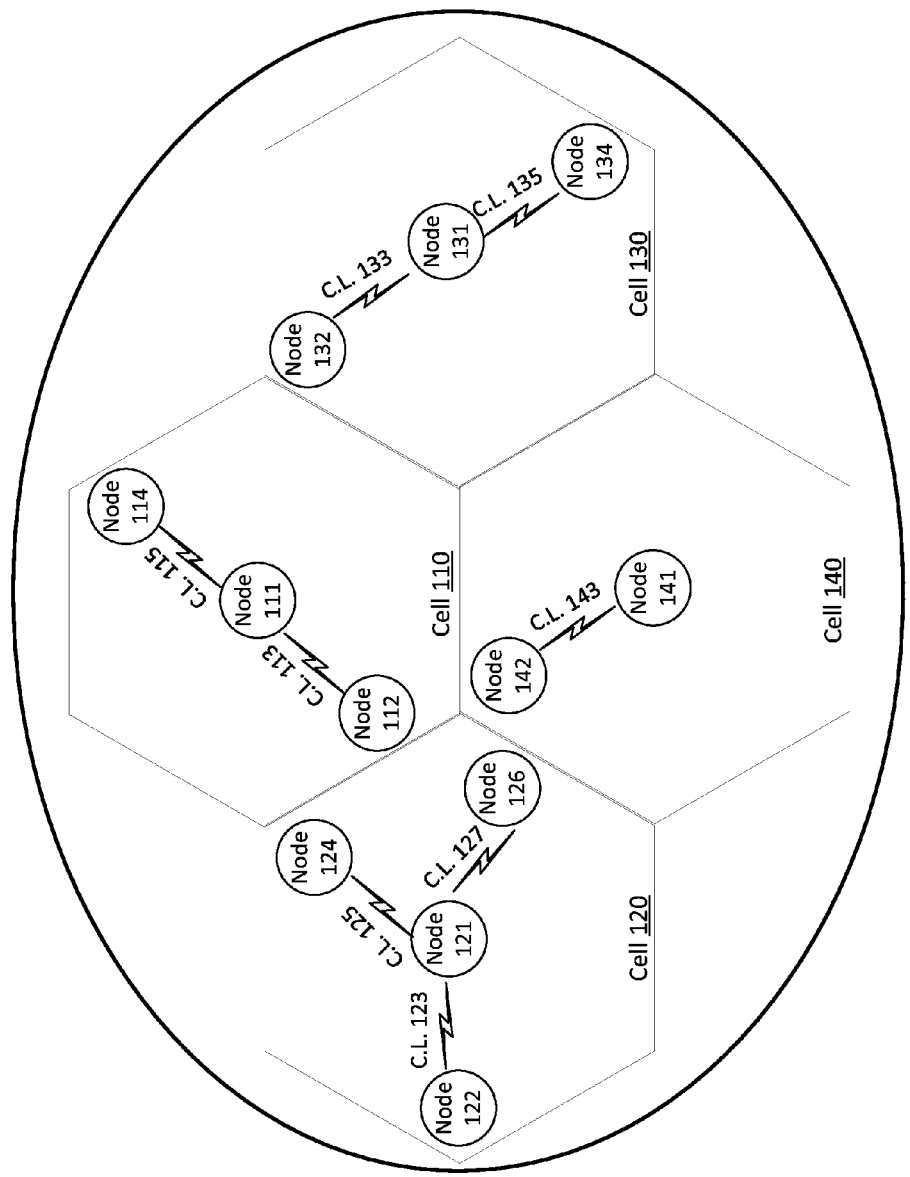
FIG. 1 illustrates an example of a wireless local access network.

Examples are generally directed to simultaneous transmit and receive (STR) systems or full duplex systems that may be deployed or used in wireless local access networks (WLANs) that also use collision avoidance schemes such as carrier sense multiple access (CSMA). These STR systems using CSMA may be included with or implemented by nodes in WLANs that may be configured to operate in accordance with various wireless network standards. These wireless network standards may include standards promulgated by the Institute of Electrical Engineers (IEEE). These wireless network standards may include Ethernet wireless standards (including progenies and variants) associated with the IEEE 802.11-2012 Standard for Information technology—Telecommunications and information exchange between systems—Local and metropolitan area networks— Specific requirements Part 11: WLAN Media Access Controller (MAC) and Physical Layer (PHY) Specifications, published March 2012, and/or later versions of this standard ("IEEE 802.11"). The examples are not limited in this context.

According to some examples, multiple nodes may be included in a WLAN. For some examples, the multiple nodes may either be part of a single cell WLAN or part of a multi-cell WLAN. For a given cell in the WLAN, one or more nodes may wirelessly couple to the WLAN via a given node serving as an access point (AP) node for the given cell. In some examples, separate nodes (e.g., terminal nodes) in the given cell may be located such that each node can sense transmissions from the AP node but may not sense transmissions from each respective node to the AP node. Since the separate nodes may not sense each other's transmissions, CSMA is not effectively implemented in this situation. The separate nodes not being able to sense each other's transmissions when using CSMA is commonly referred to as a hidden node issue.

In some examples, STR systems may allow for the simultaneous transmitting and receiving of packets by a node in a WLAN at a same time and in a same frequency. A potential solution to CSMA-related hidden node issues is to have the AP node transmit a dummy packet back to a source node concurrent with receiving a packet from the source node. Possibly hidden nodes can sense the transmission of the dummy packet and may then withhold their respective transmissions to the AP. For single cell WLANs this solution works well and reduces and possibly eliminates collisions. However, WLANs having multiple cells may still have collisions if two nodes from separate cells simultaneously transmit packets to their respective AP nodes.

According to some examples, the probability of the types of collisions mentioned above may increase substantially as the number of cells and/or nodes increase. Further, potential solutions involving the dummy packet typically include the source node continuing to transmit a packet even if a packet having a dummy payload is not received from the destination AP node. As a result of continuing to transmit a packet other nodes in different cells may sense this continued transmission by the source node and may withhold their respective transmissions. Hence, the communication channel may be unnecessarily tied up for the packet duration. Also, the source node wastes transmission time as the source node still needs to retransmit the packet. Both the unnecessary tie up of the communication channel and transmitting the entire packet may have a negative impact on throughput for a WLAN having nodes that implement CSMA. It is with respect to these and other challenges that the examples described herein are needed.

According to some examples, a first method may be implemented at a source node in a WLAN. For these examples, a packet may be transmitted at the source node that has a first header and a first data payload. The packet may be transmitted to a destination node in the WLAN. Also, for these examples, the first data payload may continue to be transmitted to the destination node based on whether at least a second header for an implicit acknowledgement (ACK) packet has been received from the destination node to indicate receipt of at least the first header by the destination node. Transmission of a remaining portion of the first data payload may be stopped if the second header for the implicit ACK packet has not been received within a defined time interval. In some examples, transmission of the remaining portion of the first data payload may also be stopped by the source node if a dummy/packet payload sent with the implicit ACK packet by the destination node is not successfully decoded.

In some other examples, a second method may be implemented at a destination node in a WLAN. For these other examples, a packet may be received at the destination node. The packet may include a first header and a first data payload and may have been transmitted from a source node in the WLAN. Also, for these other examples, an implicit ACK packet may be generated that has a second header and may include either a dummy payload if no data is awaiting transmission to the source node or a second data payload if data is awaiting transmission to the source node. The implicit ACK packet may be transmitted to the source node following successful decoding of the first header and concurrent with receiving and decoding the first data payload included in the packet received from the source node.

FIG. 1 illustrates an example wireless local access network (WLAN) 100. In some examples, as shown in FIG. 1, WLAN 100 includes cells 110, 120, 130 and 140. Also, as shown in FIG. 1, cell 110 includes node 111 coupled to nodes 112 and 114 via communication links (c.l.s) 113 and 115, respectively. Also, cell 120 includes node 121 coupled to nodes 122, 124 and 124 via c.l.s 123, 125 and 127, respectively. Cell 130 includes node 131 coupled to nodes 132 and 134 via c.l.s 133 and 1135, respectively. Cell 140 includes node 141 coupled to node 142 via c.l. 143.

In some examples, WLAN 100 may be capable of operating in compliance with at least one or more wireless communication standards or specifications associated with IEEE 802.11 standards. Also, for these examples, the nodes depicted in FIG. 1 may be capable of using CSMA to reduce transmission collisions when transmitting packets. According to some examples, nodes 111, 121, 131 and 141 may be access point (AP) nodes for cells 110, 120, 130 and 140, respectively. Also, nodes 112, 114, 122, 124, 126, 132, 134 and 142 may be terminal nodes that may separately transmit packets to their respective AP nodes via c.l.s 113, 115, 123, 125, 127, 133, 135 and 143, respectively.

According to some examples, the nodes of WLAN 100 shown in FIG. 1 may include logic and/or features to enable simultaneous transmit and receive (STR) of packets between nodes. For example, nodes 112 and 111 may each include logic and/or features to enable STR of packets transmitted/received via c.l. 113.

In some examples, nodes located near either nodes 111 or 112 may include logic and/or features to use CSMA to avoid or reduce transmission collisions when sensing that other nodes are currently transmitting packets. For example, nodes 124, 126 or 142 from cells 120 and 140 may be able to sense when node 112 is transmitting packets to node 111 via c.l. 113. Also, nodes 114, 132 or 142 from cells 110, 140 and 130 may be able to sense when node 111 is transmitting packets to node 112 via c.l. 113. For both of these examples, nodes sensing transmission of a packet via c.l. 113 may withhold transmission of packets to their respective AP nodes until the transmission is no longer sensed or detectable.

As described more below, logic and/or features separately located at a source node such as node 112 or a destination node such as node 111 may implement techniques to quickly recognize whether a packet sent/transmitted from the source node has been received by the destination node (e.g., via receipt of an implicit ACK packet) and to either continue transmission of the packet or stop transmission to free up the channel so nodes withholding their transmissions can transmit. Also, as described more below, logic and/or features located at a destination node may implement STR such that a dummy payload or data payload (if data is available) is included in an implicit ACK packet transmitted responsive to successful receipt and decoding of at least a packet header for a packet transmitted from the source node. According to some examples, both of these techniques may improve cumulative data throughputs for WLAN 100.

Figure 2:
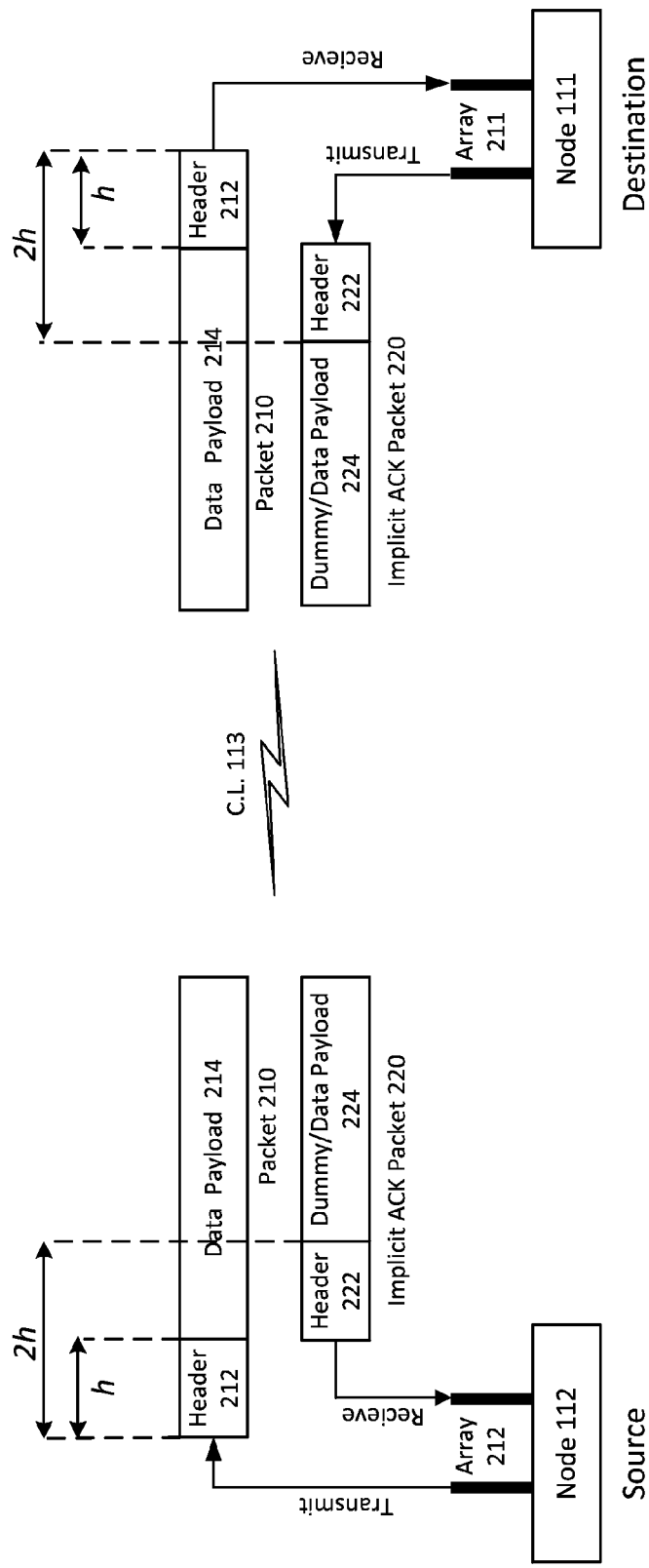
FIG. 2 illustrates an example of a first collision free transmission.

FIG. 2 illustrates an example of a first collision free transmission. In some examples, as shown in FIG. 2, the first collision free transmission includes collision free transmission 200. In some examples, collision free transmission 200 may involve a source node 112 transmitting a packet 210 via c.l. 113 to a destination node 111.

According to some examples, as shown in FIG. 2, source node 112 may include an array 212. Array 212 may include one or more antennas that may couple to logic and/or features of source node 112 to enable a transmission of packet 210 while receiving an implicit ACK packet 220 transmitted from destination node 111 responsive to receipt of at least header 212 of packet 210. Also, destination node 111 may include an array 211. Array 211 may include one or more antennas that may couple to logic and/or features of destination node 111 to enable receipt of packet 210 while transmitting implicit ACK packet 220 to source node 112. In other words, arrays 211 and 212 may separately include one or more antennas and/or other components coupled to the logic and/or features of respective destination node 111 and source node 112 to implement STR.

In some examples, a parameter "h" is shown in FIG. 2 to indicate a defined time interval that may be a given time associated with an amount of time logic and/or features at source node 112 or destination node 111 needs to detect/receive and successfully decode a header in a packet transmitted via c.l. 113. For these examples, the given time for h may be defined as a fractional time of packet duration for detecting/receiving energy of a signal transmitted from source node 112 and successfully decoding at least the header. So as shown in FIG. 2, in some examples, header 212 of packet 210 may be received and decoded by destination node 111 in a given time represented by h.

According to some examples, responsive to receiving and successfully decoding header 212, destination node 111 may include logic and/or features to generate and transmit implicit ACK packet 220 having a header 222. For these examples, logic and/or features at source node 112 may receive and successfully decode header 222 in another given time represented by 2h. In other words, at least a total time of 2h may be needed before the logic and/or features of source node 112 may determine whether a collision free transmission has occurred to destination node 111 via c.l. 113. Also, for these examples, the total time of 2h assumes a relatively insubstantial delay between destination node 111 receiving and decoding header 212, generating and transmitting at least header 222 of implicit ACK packet 220 and source node 112 receiving and decoding header 222.

In some examples, as shown in FIG. 2, implicit ACK packet 220 may have a header 222 and a dummy/data payload 224. Dummy/data payload 224 indicates that logic and/or features at destination node 111 may include either a dummy payload if no data is awaiting transmission to source node 112 or a data payload if data is awaiting transmission to source node 112. For these examples, the inclusion of either a dummy or data payload recognizes the asynchronous nature of data scheduling in a WLAN. In other words, destination node 111 may or may not have data to transmit to source node 112 at the time implicit ACK packet 220 is generated. Also, as described more below, a combination of dummy payload and data payload may be transmitted should data become available during the transmission of an implicit ACK packet to source node 112.

According to some examples, destination node 111, source node 112 and other nodes in WLAN 100 may be capable of implementing CSMA for transmitting packets via c.l.s in WLAN 100. For these examples, the transmission of dummy/data payload 224 of implicit ACK packet 220 may indicate to the other nodes in WLAN 100 that a communication link is being used by source node 112 for a given time associated with source node 112 transmitting packet 210 to destination node 111 via c.l. 113. As a result of this indication, the other nodes may withhold transmission of packets for at least the given time. For example, node 114 of cell 110 may withhold transmission for at least the given time. Also, node 132 of cell 130 may withhold transmission of packets for at least the given time.

Examples described herein are not limited to packets or implicit ACK packets having headers and payloads in a same or similar proportion as shown in FIG. 2. Headers of other sizes that may include a smaller or larger portion or fraction of a packet's overall size/length are contemplated.

Figure 3:
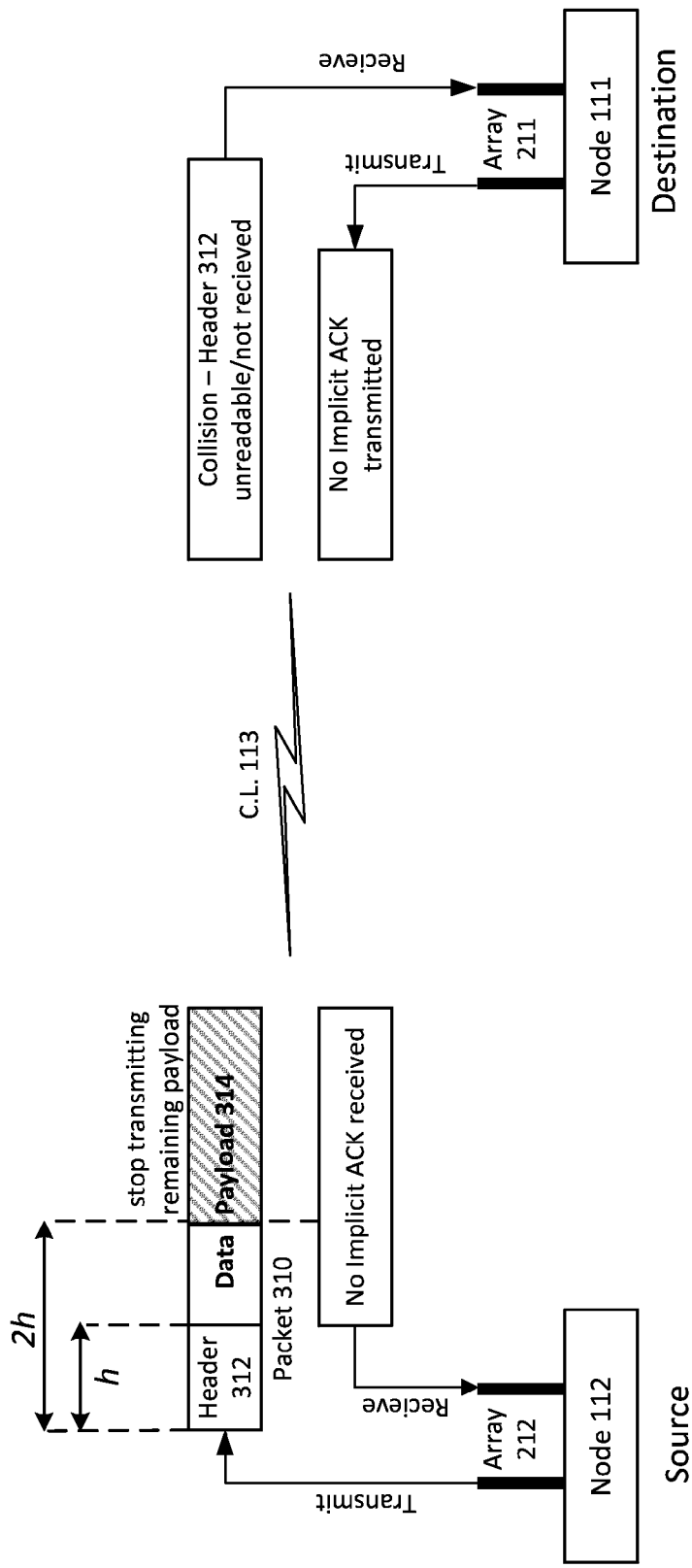
FIG. 3 illustrates an example of a collision transmission.

FIG. 3 illustrates an example collision transmission 300. In some examples, as shown in FIG. 3, packet 310 having a header 312 and a data payload 314 may be transmitted by source node 112 to destination node 111 via c.l. 113. For these examples, a collision may occur between the transmission of packet 310 by source node 112 and another node in WLAN such as node 113. As a result of the collision, header 312 may be unreadable or even not received by destination node 111.

In some examples, as shown in FIG. 3, logic and/or features of source node 112 may determine that packet 310 was not received within a defined time interval such as a given time associated with source node 112 receiving and decoding a header for an implicit ACK packet sent or transmitted by destination node 111 responsive to receiving packet 310. As mentioned previously and as shown in FIG. 3, the given time is represented by 2h. For these examples, the logic and/or features at source node 112 may then stop transmission of a remaining portion of data payload 314.

According to some examples, stopping transmission of the remaining portion of payload 314 may allow other nodes that were sensing source node 112's transmission and withholding their transmissions to now transmit packets. In some instances where packet 310 may have included a large data payload, cutting the transmission after a period of time equivalent to 2h may allow the other nodes to transmit substantially sooner than if they had to wait until the full packet was transmitted.

Figure 4:
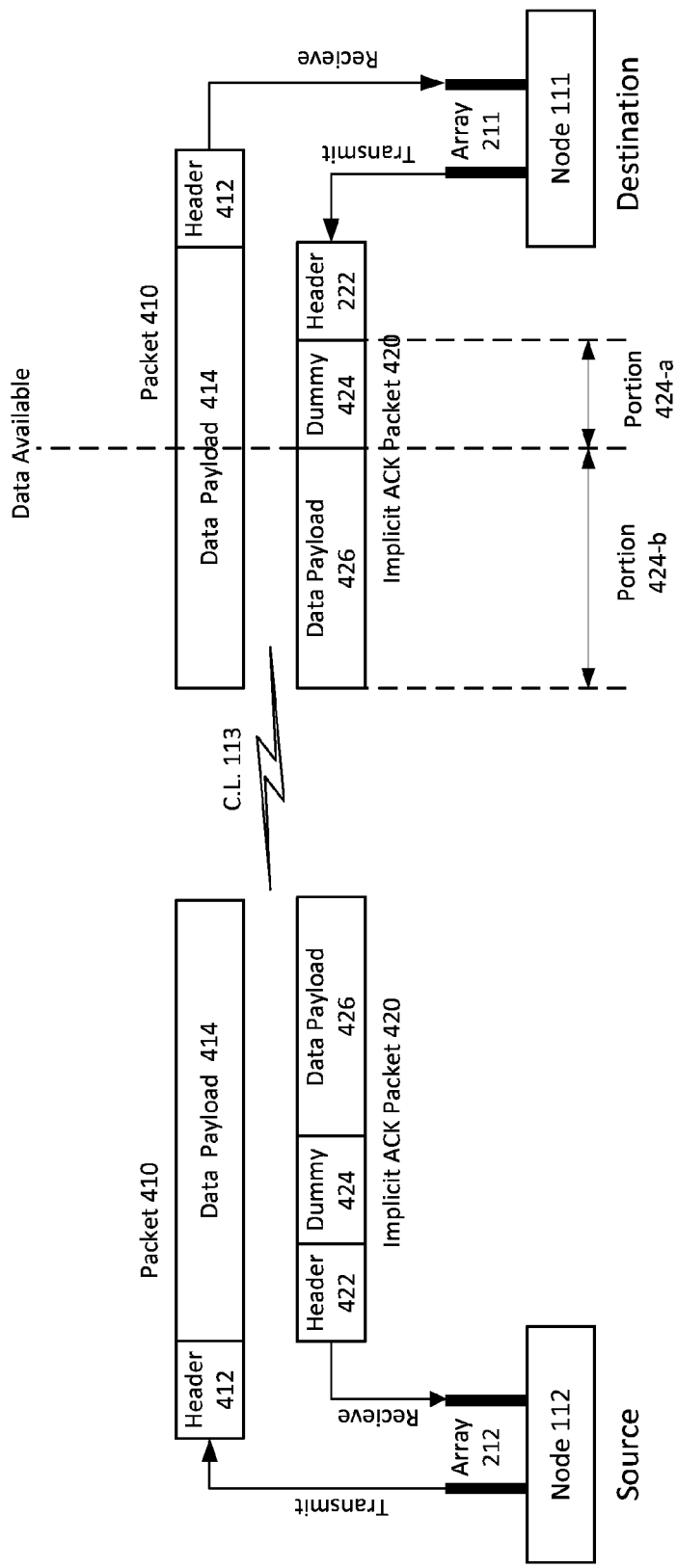
FIG. 4 illustrates an example of a second collision free transmission.

FIG. 4 illustrates an example of a second collision free transmission. In some examples, as shown in FIG. 4, the second collision free transmission includes collision free transmission 400. In some examples, collision free transmission 400 may involve source node 112 transmitting a packet 410 via c.l. 113 to destination node 111.

According to some examples, as shown in FIG. 4, source node 112 may transmit packet 410 having a header 412 and a data payload 414 to destination node 111 via c.l. 113. Also, destination node 111 may transmit implicit ACK packet 420 responsive to receiving and successfully decoding at least header 412 for packet 410. For these examples, logic and/or features at destination node 111 may be capable of generating implicit ACK packet 420 to include a dummy payload 424 based on no data being available when implicit ACK packet 420 was first generated.

In some examples, data to be transmitted to source node 112 may become available during the time destination node 111 is transmitting implicit ACK packet 420. For these examples, the logic and/or features of destination node 111 may be capable of replacing a second portion of dummy payload 424 (shown as portion 424-b) with data payload 426. Although not shown in FIG. 4, data payload 426 may include a header for the data and at least a portion of the available data to be transmitted to source node 112. Source node 112 may include logic and/or features to recognize the switch from a dummy payload to actual data based on the header for data payload 426. Replacing at least a portion of the dummy payload with actual data destined for source node 112 may serve to increase data throughput in WLAN 100.

Figure 5:
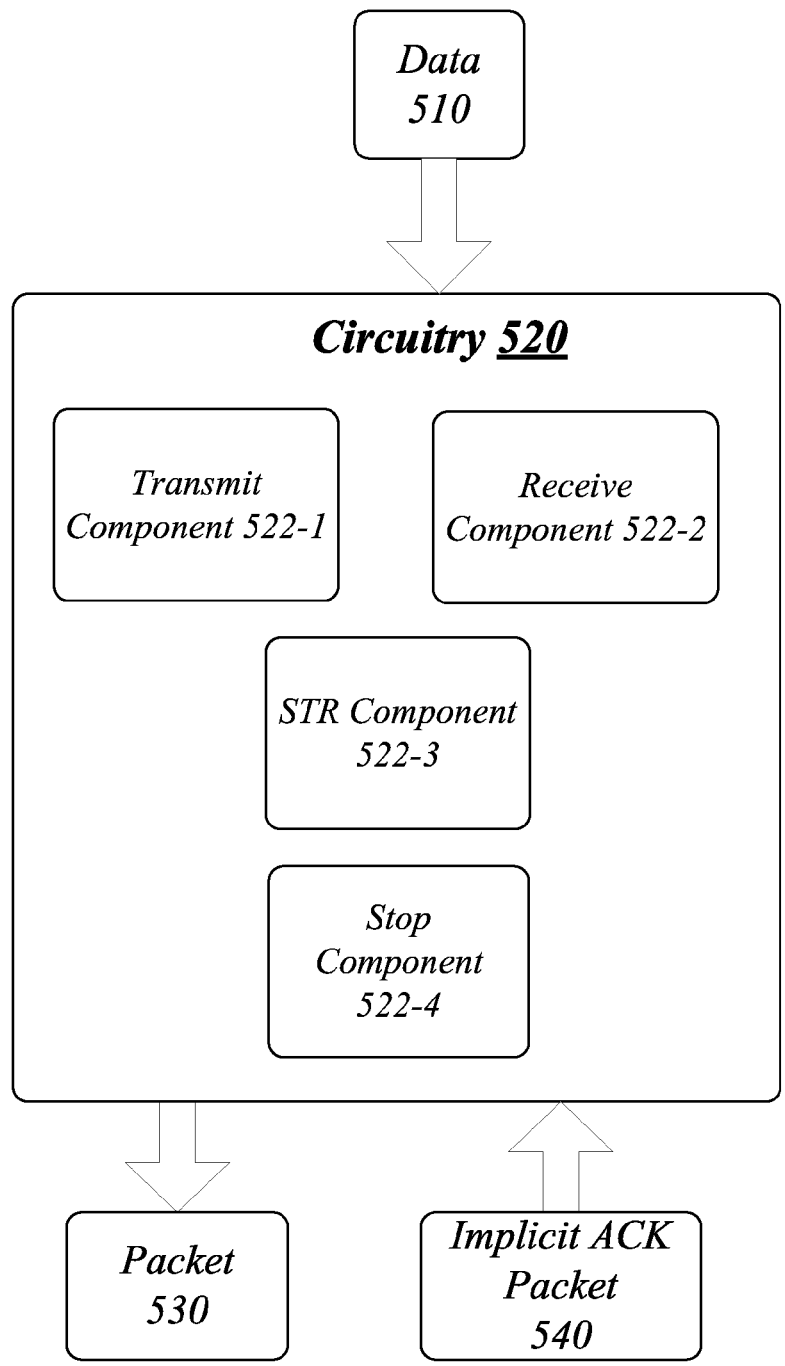
FIG. 5 illustrates an example block diagram for a first apparatus.

FIG. 5 illustrates a block diagram for a first apparatus. As shown in FIG. 5, the first apparatus includes an apparatus 500. Although apparatus 500 shown in FIG. 5 has a limited number of elements in a certain topology or configuration, it may be appreciated that apparatus 500 may include more or less elements in alternate configurations as desired for a given implementation.

The apparatus 500 may include a computer and/or firmware implemented apparatus 500 having circuitry 520 arranged to execute one or more components 522-a. It is worthy to note that "a" and "b" and "c" and similar designators as used herein are intended to be variables representing any positive integer. Thus, for example, if an implementation sets a value for a=3, then a complete set of components 522-a may include modules 522-1, 522-2, 522-3 or 522-4. The examples are not limited in this context.

According to some examples, apparatus 500 may be included in a source node in a WLAN. The source node and the WLAN may be capable of operating in compliance with one or more wireless technologies such as those described in or associated with the IEEE 802.11 standards. For example, the source node having apparatus 500 may be arranged or configured to wirelessly couple to other nodes such as AP nodes in a WLAN operated in compliance with one or more IEEE 802.11 standards. The examples are not limited in this context.

In some examples, as shown in FIG. 5, apparatus 500 includes circuitry 520. Circuitry 520 may be generally arranged to execute one or more components 522-a. Circuitry 520 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Qualcomm® Snapdragon®; Intel® Celeron®, Core (2) Duo®, Core i3, Core i5, Core i7, Itanium®, Pentium®, Xeon®, Atom® and XScale® processors; and similar processors. Dual microprocessors, multi-core processors, and other multi-processor architectures may also be employed as circuitry 520. According to some examples circuitry 520 may also be an application specific integrated circuit (ASIC) and components 522-a may be implemented as hardware elements of the ASIC.

According to some examples, apparatus 500 may include a transmit component 522-1. Circuitry 520 may execute transmit component 522-1 to transmit a packet having a first header and a first data payload to a destination node in a WLAN via which a source node having apparatus 500 may be wirelessly coupled. For these examples, data 510 may be included in the first data payload of packet 530 having the first header.

In some examples, apparatus 500 may also include a received component 522-2. Circuitry 520 may execute receive component 522-2. Receive component 522-2 may be capable of receiving and decoding an implicit ACK packet having a second header from the destination node. The implicit ACK may indicate receipt of at least the first header by the destination node. For these examples, the second header may be associated with implicit ACK packet 540 received from the destination node responsive to the destination node's receiving and decoding of at least the first header for packet 530.

According to some examples, apparatus 500 may also include an STR component 522-3. Circuitry 520 may execute STR component 522-3 to enable transmit component 522-1 to transmit at least portions of the packet to the destination node while receive component 522-2 receives the implicit ACK packet from the destination node. STR component 522-3 may be coupled to one or more antennas for the source node to enable the simultaneous transmitting and receiving of the respective second header and portions of the packet. For these examples, the at least portions transmitted by transmit component 522-1 may include at least a portion of the first data payload for packet 530 while receive component 522-2 is receiving the second header associated with implicit ACK packet 540.

In some examples, apparatus 500 may also include a stop component 522-4. Circuitry 520 may execute stop component 522-4 to cause transmit component 522-1 to stop transmission of any remaining portion of the first data payload awaiting transmission if stop component 522-2 has determined that the second header for the implicit ACK packet has not been received within a defined time interval such as a given time associated with receive component 522-2 receiving and successfully decoding at least the second header. For these examples, stop component 522-4 may cause transmit component 522-1 to stop transmission of any remaining portion of the first data payload for packet 530. The remaining portion may be stopped if receive component 522-2 has not received and/or decoded the second header for implicit ACK packet 540 with in a given time that represents the time to generate and transmit the first header for packet 530 and then detect/receive the second header for the responsive implicit ACK packet 540 (e.g., parameter 2h).

According to some examples, stop component 522-4 may also cause transmit component 522-1 to stop transmission of any remaining portion of the first data payload for packet 530 if stop component 522-4 has determined that receive component 522-2 has not received and successfully decoded at least a portion of a dummy/data payload for implicit ACK packet 540. Not receiving and successfully decoding the portion of the dummy/data payload for implicit ACK packet 540 may indicate possible collision of the transmission of the first data payload for packet 530. Hence, packet 530 may need to be retransmitted to the destination node.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

FIG. 6 illustrates an example of a first logic flow. As shown in FIG. 6, the first logic flow includes a logic flow 600. Logic flow 600 may be representative of some or all of the operations executed by one or more logic, features, or devices described herein, such as apparatus 500. More particularly, logic flow 600 may be implemented by transmit component 522-1, receive component 522-2, STR component 522-3 or stop component 522-4.

In the illustrated example shown in FIG. 6, logic flow 600 at block 602 may include transmitting, at source node in a WLAN, a packet having a first header and a first data payload to a destination node in the WLAN. For these examples, transmit component 522-1 may transmit packet 530 that has the first header and the first data payload to the destination node.

According to some examples, logic flow 600 at block 604 may include continuing to transmit the first data payload to the destination node based on whether at least a second header for an implicit ACK packet has been received from the destination node to indicate receipt of at least the first header by the destination node. For these examples, transmit component 522-1 may continue to transmit packet 530 based on receive component 522-2 receiving the second header for implicit ACK packet 540.

According to some examples, logic flow 600 at block 606 may include stopping transmission of a remaining portion of the first data payload awaiting transmission if the second header for the implicit ACK packet has not been received within a defined time interval. For these examples, stop component 522-4 may stop transmission of the remaining portion of the first data payload for packet 530 if the second header for implicit ACK packet 540 has not been received within a defined time interval such as a given time represented by the parameter 2h as mentioned above for FIG. 5.

FIG. 7 illustrates an embodiment of a first storage medium. As shown in FIG. 7, the first storage medium includes a storage medium 700. Storage medium 700 may comprise an article of manufacture. In some examples, storage medium 700 may include any non-transitory computer readable medium or machine readable medium, such as an optical, magnetic or semiconductor storage. Storage medium 700 may store various types of computer executable instructions, such as instructions to implement logic flow 600. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 8:
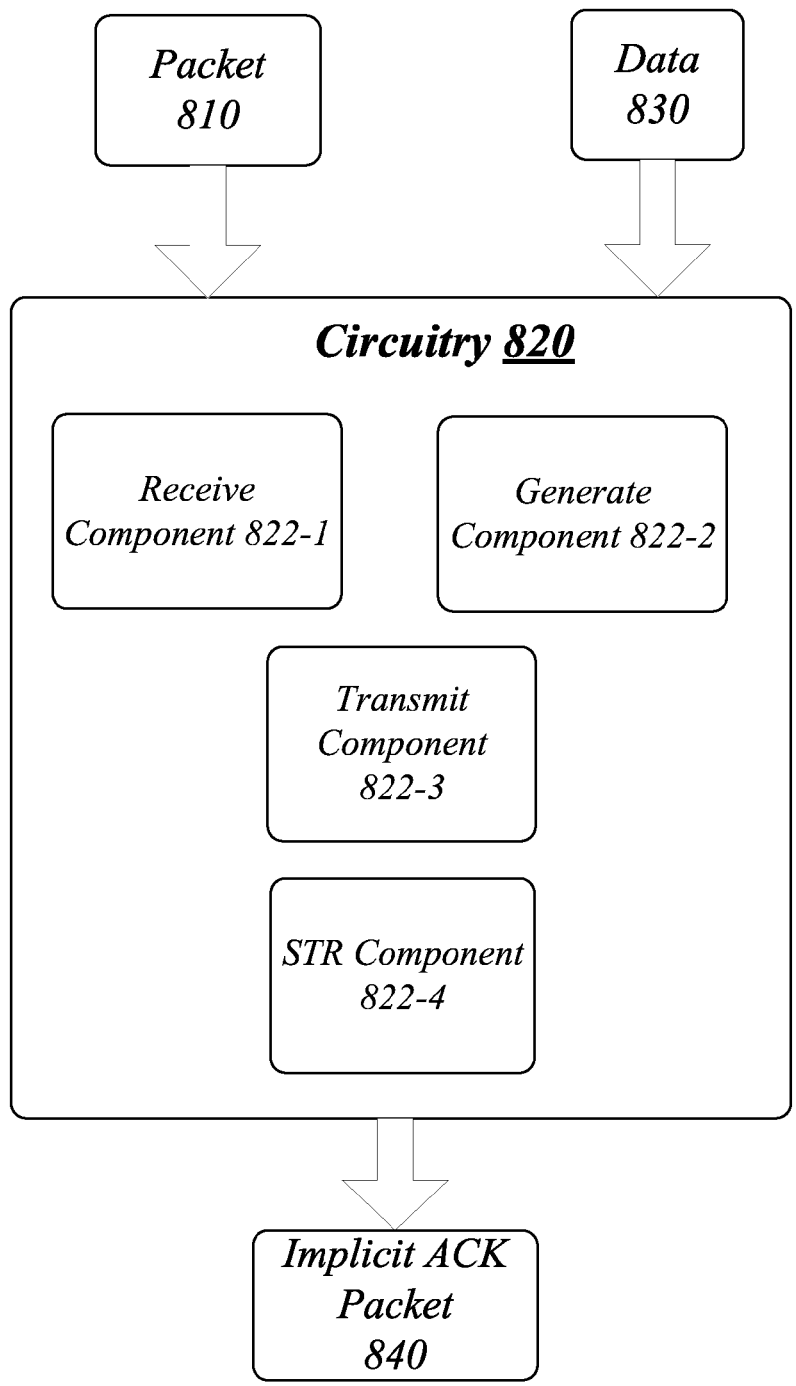
FIG. 8 illustrates an example block diagram for a second apparatus.

FIG. 8 illustrates a block diagram for a second apparatus. As shown in FIG. 8, the second apparatus includes an apparatus 800. Although apparatus 800 shown in FIG. 8 has a limited number of elements in a certain topology or configuration, it may be appreciated that apparatus 800 may include more or less elements in alternate configurations as desired for a given implementation.

The apparatus 800 may comprise a computer-implemented apparatus 800 having circuitry 820 arranged to execute one or more components 822-a. Similar to apparatus 500 for FIG. 5, "a" and "b" and "c" and similar designators may be variables representing any positive integer.

According to some examples, apparatus 500 may be included in a destination node in a WLAN. The destination node and the WLAN may be capable of operating in compliance with one or more wireless technologies such as those described in or associated with the IEEE 802.11 standards. For example, the destination node having apparatus 800 may be arranged or configured to wirelessly couple to other nodes such as terminal nodes in a WLAN operated in compliance with one or more IEEE 802.11 standards. The examples are not limited in this context.

In some examples, as shown in FIG. 8, apparatus 800 includes circuitry 820. Circuitry 820 may be generally arranged to execute one or more components 822-a. The circuitry 820 can be any of various commercially available processors to include, but not limited to, those previously mentioned for circuitry 520 for apparatus 500. Dual microprocessors, multi-core processors, and other multi-processor architectures may also be employed as circuitry 820. According to some examples circuitry 820 may also be an application specific integrated circuit (ASIC) and components 822-a may be implemented as hardware elements of the ASIC.

According to some examples, apparatus 800 may include a receive component 822-1. Circuitry 820 may execute receive component 822-1 to receive a packet including a first header and a first data payload from a source node in the WLAN. For these examples, packet 810 may be received by receive component 822-1 from the source node.

In some examples, apparatus 800 may also include a generate component 822-2. Circuitry 820 may execute generate component 822-2 to generate an implicit ACK packet having a second header. The implicit ACK packet may also include either a dummy payload if no data is awaiting transmission to the source node or a second data payload if data is awaiting transmission to the source node. For these examples, generate component 822-2 may generate implicit ACK packet 840 having the second header. Also if data 830 includes data awaiting transmission to the source node, at least some of the data may be added to the second data payload. Otherwise the dummy payload is added to implicit ACK packet 840. In some examples, should data later become available, a portion of the dummy payload may be replaced with the newly available data.

According to some examples apparatus 800 may also include a transmit component 822-3. Circuitry 820 may execute transmit component 822-3 to transmit the implicit ACK packet to the source node following successful decoding of the first header and concurrent with receiving and decoding the first data payload included in the packet received from the source node. For these examples, transmit component 822-3 may transmit implicit ACK packet 840 following successful decoding of the first header for packet 810 by receive component 822-1. Also, transmit component 822-3 may transmit implicit ACK packet 840 concurrent with receive component 822-1 receiving the first data payload for packet 830.

According to some examples, apparatus 800 may also include an STR component 822-4. Circuitry 820 may execute STR component 822-4 to enable receive component 822-1 to receive the packet from the source node while transmit component 822-3 transmits the implicit ACK packet to the source node. STR component 822-4 may be coupled to one or more antennas for the destination node to enable the simultaneous transmitting and receiving of the respective packet and implicit ACK packet.

Various components of apparatus 800 and a device implementing apparatus 800 may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

FIG. 9 illustrates an example of a second logic flow. As shown in FIG. 9, the second logic flow includes a logic flow 900. Logic flow 900 may be representative of some or all of the operations executed by one or more logic, features, or devices described herein, such as apparatus 800. More particularly, logic flow 900 may be implemented by receive component 822-1, generate component 822-2, transmit component 822-3 or STR component 822-4.

In the illustrated example shown in FIG. 9, logic flow 900 at block 902 may include receiving, at a destination node for a WLAN, a packet including a first header and a first data payload from a source node in the WLAN. For these examples, receive component 822-1 may receive packet 830 that includes the first header and first data payload.

According to some examples, logic flow 900 at block 904 may include generating an implicit ACK packet having a second header. The implicit ACK packet may also include either a dummy payload if no data is awaiting transmission to the source node or a second data payload if data is awaiting transmission to the source node. For these examples, generate component 822-2 may generate implicit ACK packet 840 having the second header. Implicit ACK packet 840 may include a dummy payload if data 830 does not include data awaiting transmission to the source node. If data 830 does include data to be transmitted to the source node, then a data payload is added to implicit ACK packet 840.

According to some examples, logic flow 900 at block 906 may include transmitting the ACK packet to the source node following successful decoding of the first header and concurrent with receiving and decoding the first data payload included in the packet received from the source node. For these examples, STR component 822-4 may enable transmit component 822-3 to transmit implicit ACK packet 840 to the source node following successful decoding of the first header for packet 810 by receive component 822-1 and concurrent with receive component receiving and decoding the first payload included in packet 810.

In some examples, logic flow 900 at block 908 may include determining that data has become available after at least a first portion of the dummy payload has been transmitted. For these examples, generate component 822-2 may determine that data 830 now includes data to transmit to the source node.

According to some examples, logic flow 900 at block 910 may include replacing a second portion of the dummy payload awaiting transmission with a third header associated with the available data and a third data payload including at least some of the available data. For these examples, generate component 822-2 may replace a portion of the dummy payload for implicit ACK packet 840 that has yet to be transmitted to the source node by transmit component 822-3 with the third header and at least some of the data included in data 830 that is now available for transmission to the source node.

In some examples, logic flow 900 at block 910 may include transmitting the second portion to the source node. For these examples, transmit component 822-3 may then transmit the second portion of what was originally the dummy payload of implicit ACK packet 840 and now includes the third header and the data payload having at least some of the newly available data.

FIG. 10 illustrates an embodiment of a first storage medium. As shown in FIG. 10, the first storage medium includes a storage medium 1000. Storage medium 1000 may comprise an article of manufacture. In some examples, storage medium 1000 may include any non-transitory computer readable medium or machine readable medium, such as an optical, magnetic or semiconductor storage. Storage medium 1000 may store various types of computer executable instructions, such as instructions to implement logic flow 900. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 11:
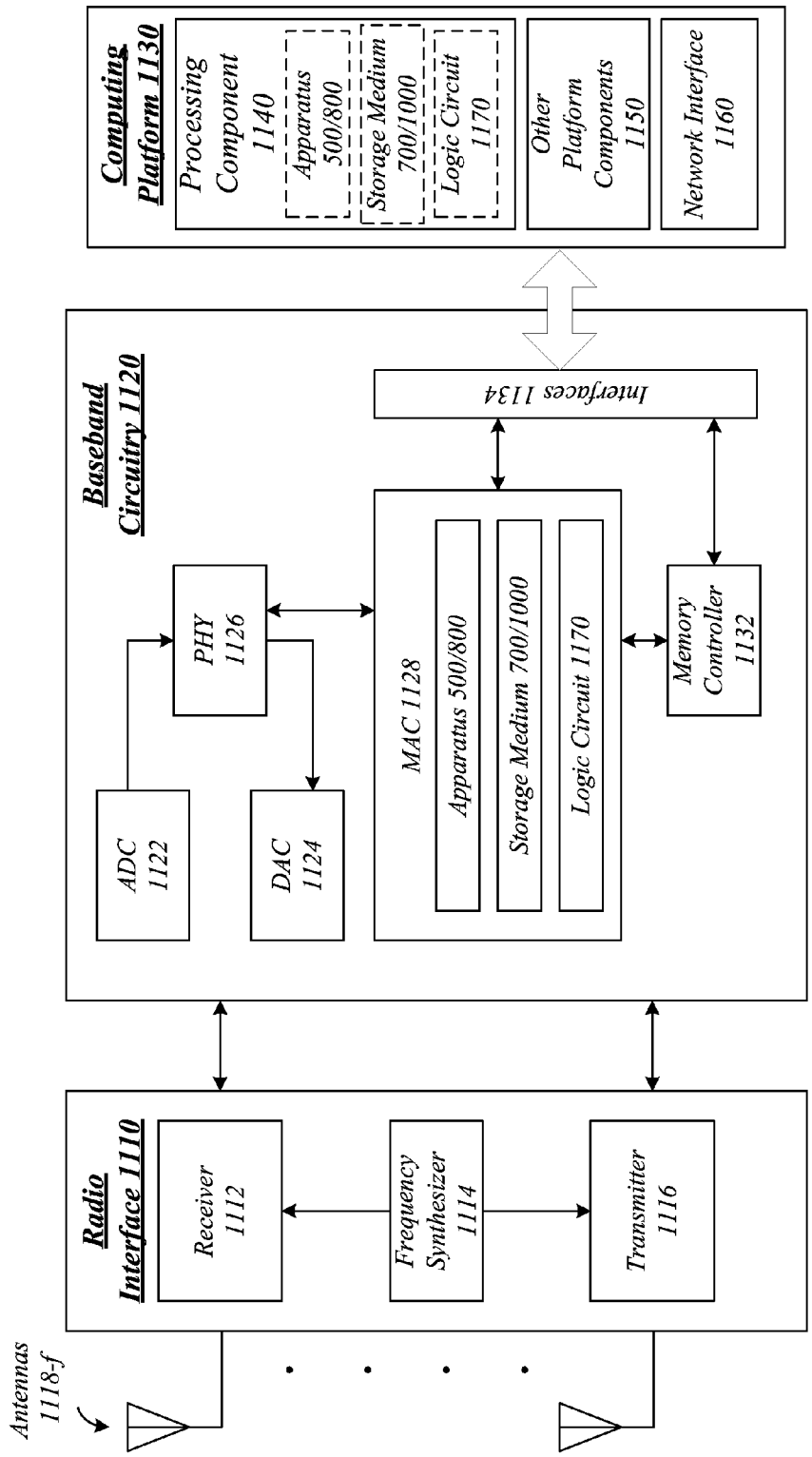
FIG. 11 illustrates an example of a device.

FIG. 11 illustrates an embodiment of a device 1100. In some examples, device 1100 may be configured or arranged for wireless communications in a wireless network such as a WLAN. Device 1100 may implement, for example, apparatus 500/800, storage medium 700/1000 and/or a logic circuit 1170. The logic circuit 1170 may include physical circuits to perform operations described for apparatus 500/800. As shown in FIG. 11, device 1100 may include a radio interface 1110, baseband circuitry 1120, and computing platform 1130, although examples are not limited to this configuration.

The device 1100 may implement some or all of the structure and/or operations for apparatus 500/800, storage medium 700/1000 and/or logic circuit 1170 in a single computing entity, such as entirely within a single device. The embodiments are not limited in this context.

radio interface 1110 may include a component or combination of components adapted for transmitting and/or receiving single carrier or multi-carrier modulated signals (e.g., including complementary code keying (CCK) and/or orthogonal frequency division multiplexing (OFDM) symbols and/or single carrier frequency division multiplexing (SC-FDM symbols) although the embodiments are not limited to any specific over-the-air interface or modulation scheme. Radio interface 1110 may include, for example, a receiver 1112, a transmitter 1116 and/or a frequency synthesizer 1114. Radio interface 1110 may include bias controls, a crystal oscillator and/or one or more antennas 1118-*f*. In another embodiment, radio interface 1110 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1120 may communicate with radio interface 1110 to process receive and/or transmit signals and may include, for example, an analog-to-digital converter 1122 for down converting received signals, a digital-to-analog converter 1124 for up converting signals for transmission. Further, baseband circuitry 1120 may include a baseband or physical layer (PHY) processing circuit 1126 for PHY link layer processing of respective receive/transmit signals. Baseband circuitry 1120 may include, for example, a processing circuit 1128 for medium access control (MAC)/data link layer processing. Baseband circuitry 1120 may include a memory controller 1132 for communicating with MAC processing circuit 1128 and/or a computing platform 1130, for example, via one or more interfaces 1134.

In some embodiments, PHY processing circuit 1126 may include a frame construction and/or detection module, in combination with additional circuitry such as a buffer memory, to construct and/or deconstruct communication frames (e.g., containing subframes). Alternatively or in addition, MAC processing circuit 1128 may share processing for certain of these functions or perform these processes independent of PHY processing circuit 1126. In some embodiments, MAC and PHY processing may be integrated into a single circuit.

Computing platform 1130 may provide computing functionality for device 1100. As shown, computing platform 1130 may include a processing component 1140. In addition to, or alternatively of, baseband circuitry 1120 of device 1100 may execute processing operations or logic for apparatus 500/800, storage medium 700/1000, and logic circuit 1170 using the processing component 1130. Processing component 1140 (and/or PHY 1126 and/or MAC 1128) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

Computing platform 1130 may further include other platform components 1150. Other platform components 1150 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Computing platform 1130 may further include a network interface 1160. In some examples, network interface 1160 may include logic and/or features to support network interfaces operated in compliance with one or more wireless broadband technologies such as those described in one or more standards associated with IEEE 802.11 such as IEEE 802.11u or with technical specification such as WFA Hotspot 2.0.

Device 1100 may be part of a source or destination node in a WLAN and may be include in various types of computing devices to include, but not limited to, user equipment, a computer, a personal computer (PC), a desktop computer, a laptop computer, a notebook computer, a netbook computer, a tablet computer, an ultra-book computer, a smart phone, embedded electronics, a gaming console, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, functions and/or specific configurations of device 1100 described herein, may be included or omitted in various embodiments of device 1100, as suitably desired. In some embodiments, device 1100 may be configured to be compatible with protocols and frequencies associated with IEEE 802.11 Standards or Specification for WLANs, although the examples are not limited in this respect.

Embodiments of device 1100 may be implemented using single input single output (SISO) architectures. However, certain implementations may include multiple antennas (e.g., antennas 1118-f) for transmission and/or reception using adaptive antenna techniques for beamforming or spatial division multiple access (SDMA) and/or using multiple input multiple output (MIMO) communication techniques.

The components and features of device 1100 may be implemented using any combination of discrete circuitry, application specific integrated circuits (ASICs), logic gates and/or single chip architectures. Further, the features of device 1100 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1100 shown in the block diagram of FIG. 11 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled", "connected", or "capable of being coupled" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

In some examples, an example first apparatus for a source node in a WLAN may include circuitry. The example first apparatus may also include a transmit component for execution by the circuitry to transmit a packet having a first header and a first data payload to a destination node in the WLAN. The example first apparatus may also include a receive component for execution by the circuitry, the receive component may wait for receipt of an implicit ACK packet having a second header from the destination node. The implicit ACK packet to indicate receipt of at least the first header by the destination node. The example first apparatus may also include a stop component for execution by the circuitry to cause the transmit component to stop transmission of any remaining portion of the first data payload awaiting transmission when the stop component has determined that the second header for the implicit ACK packet has not been received within a defined time interval.

According to some examples, the example first apparatus may also include one or more antennas and a STR component coupled to the antenna array. The STR component may be executed by the circuitry of the first apparatus to enable the transmit component to transmit at least portions of the packet to the destination node while the receive component receives the implicit ACK packet from the destination node.

In some examples for the example first apparatus, receipt of the implicit ACK packet by the receive component may include the receive component capable of receiving and successfully decoding at least the second header and determining that the implicit ACK packet was transmitted from the destination node.

According to some examples for the example first apparatus, the defined time may include a given time interval associated with the receive component receiving and successfully decoding at least the second header.

In some examples for the example first apparatus, the source node, the destination node and other nodes in the WLAN may be capable of implementing carrier sense multiple access (CSMA) for transmitting packets via the WLAN.

According to some examples for the example first apparatus, the implicit ACK packet may also have a dummy payload. The implicit ACK packet also having the dummy payload may indicate to the other nodes in the WLAN a communication link is being used by the source node for a given time associated with the transmit component transmitting the packet to the destination node.

In some examples for the example first apparatus, the stop component may cause the transmit component to stop transmission of any remaining portion of the first data payload awaiting transmission if/when the stop component has determined that at least a portion of the dummy payload has not been received and successfully decoded by the receive component.

According to some examples for the example first apparatus, the source and the destination nodes may belong to a first cell of multiple cells included in the WLAN and the other nodes may include at least one node from a second cell from among the multiple cells.

In some examples for the example first apparatus, the implicit ACK packet may also have a second data payload that includes data destined for the source node. The implicit ACK packet may have the second data payload to indicate to the other nodes in the WLAN a communication link is being used by the source node for a given time associated with the transmit component transmitting the packet to the destination node.

According to some examples for the example first apparatus, the stop component may cause the transmit component to stop transmission of any remaining portion of the first data payload awaiting transmission if the stop component has determined that at least a portion of the second data payload has not been received and successfully decoded by the receive component.

In some examples for the example first apparatus, the source and the destination nodes may belong to a first cell of multiple cells included in the WLAN and the other nodes may include at least one node from a second cell from among the multiple cells.

According to some examples for the example first apparatus, the first WLAN may be capable of operating in compliance with one or more wireless communication standards or specifications associated with IEEE 802.11 standards.

In some examples for the example first apparatus, the source node may be a terminal node and the destination node may be an access point.

In some examples, example first methods implemented at a source node in a WLAN may include transmitting, at the source node, a packet having a first header and a first data payload to a destination node in the WLAN. The example first methods may also include continuing to transmit the first data payload to the destination node based on whether at least a second header for an ACK packet has been received from the destination node to indicate receipt of at least the first header by the destination node. The example first methods may also include stopping transmission of a remaining portion of the first data payload awaiting transmission if the second header for the implicit ACK packet has not been received within a defined time interval.

According to some examples for the example first methods, successfully decoding at least the second header may include the source node capable of determining that the implicit ACK packet was transmitted from the destination node and the defined time interval associated with a given time interval for the source node to make the determination.

In some examples for the example first methods, the source node, the destination node and other nodes in the WLAN may be capable of implementing carrier sense multiple access (CSMA) for transmitting packets via the WLAN.

According to some examples for the example first methods, the implicit ACK packet may also have a dummy payload. The implicit ACK packet having the dummy payload may indicate to the other nodes in the WLAN a communication link is being used by the source node for a given time associated with the source node transmitting the packet to the destination node.

In some examples for the example first methods, the source and the destination nodes may belong to a first cell of multiple cells included in the WLAN and the other nodes may include at least one node from a second cell from among the multiple cells.

In some examples for the example first methods, the implicit ACK packet may also have a second data payload that includes data destined for the source node. The implicit ACK packet having the second data payload may indicate to the other nodes in the WLAN a communication link is being used by the source node for a given time associated with the source node transmitting the packet to the destination node.

According to some examples for the example first methods, the source and the destination nodes may belong to a first cell of multiple cells included in the WLAN and the other nodes including at least one node from a second cell from among the multiple cells.

In some examples for the example first methods, the implicit ACK packet may also have a combination of a dummy payload and a second data payload that includes data destined for the source node. The implicit ACK packet having the combination of the dummy payload and the second data payload may indicate to the other nodes in the WLAN a communication link is being used by the source node for a given time associated with the source node transmitting the packet to the destination node.

According to some examples for the example first methods, the source and the destination nodes may belong to a first cell of multiple cells included in the WLAN and the other nodes may include at least one node from a second cell from among the multiple cells.

In some examples for the example first methods, the WLAN may be capable of operating in compliance with one or more wireless communication standards or specifications associated with the IEEE 802.11 standards.

According to some examples for the example first methods, the source node may be a terminal node and the destination node may be an access point.

In some examples, a first at least one machine readable medium comprising a plurality of instructions that in response to being executed on a system at a source node in a WLAN may cause the system to transmit a packet having a first header and a first data payload to a destination node in the WLAN. The instructions may also cause the system to determine whether at least a second header for an implicit ACK packet has been received from the destination node to indicate receipt of at least the first header by the destination node. The instructions may also cause the system to stop transmission of any remaining portion of the first data payload awaiting transmission if determined that the second header for the implicit ACK packet has not been received within a defined time interval.

According to some examples for the first at least one machine readable medium, receiving and successfully decoding at least the second header may include the source node capable of determining that the implicit ACK packet was transmitted from the destination node and the defined time interval associated with a given time interval for the source node to make the determination.

In some examples for the first at least one machine readable medium, the source node, the destination node and other nodes in the WLAN may be capable of implementing carrier sense multiple access (CSMA) for transmitting packets via the WLAN.

According some examples for the first at least one machine readable medium, the implicit ACK packet may also have a dummy payload. For these examples, the implicit ACK packet having the dummy payload may indicate to the other nodes in the WLAN a communication link is being used by the source node for a given time associated with the source node transmitting the packet to the destination node.

In some examples for the first at least one machine readable medium, the implicit ACK packet may also have a second data payload that includes data destined for the source node. The implicit ACK packet having the second data payload may indicate to the other nodes in the WLAN a communication link is being used by the source node for a given time associated with the source node transmitting the packet to the destination node.

According to some examples for the first at least one machine readable medium, the implicit ACK packet may also have a combination of a dummy payload and a second data payload that includes data destined for the source node. The implicit ACK packet having the combination of the dummy payload and the second data payload to indicate to the other nodes in the WLAN a communication link is being used by the source node for a given time associated with the source node transmitting the packet to the destination node.

In some examples for the first at least one machine readable medium, the WLAN may be capable of operating in compliance with one or more wireless communication standards or specifications associated with IEEE 802.11 standards.

According to some examples for the first at least one machine readable medium, the source node may be a terminal node and the destination node may be an access point.

In some examples, an example second apparatus for a destination node in a WLAN may include circuitry. The example second apparatus may also include a generate component for execution by the circuitry to generate an implicit ACK packet having a second header. The implicit ACK packet may include either a dummy payload if no data is awaiting transmission to the source node or a second data payload if data is awaiting transmission to the source node. The example second apparatus may also include a transmit component for execution by the circuitry to transmit the implicit ACK packet to the source node following successful decoding of the first header and concurrent with receiving and decoding the first data payload included in the packet received from the source node.

According to some examples, the example second apparatus may also include one or more antennas and an STR component coupled to the one or more antennas. For these example, the STR component may be executed by the circuitry to enable the receive component to receive the packet from the source node while the transmit component transmits the implicit ACK packet to the source node.

In some examples for the example second apparatus, the destination node, the source node and other nodes in the WLAN may be capable of implementing carrier sense multiple access (CSMA) for transmitting packets via the WLAN and the dummy payload or the second data payload to indicate to the other nodes in the WLAN a communication link is being used by the source node for a given time associated with the source node transmitting the packet to the destination node.

According to some examples for the example second apparatus, the destination and the source nodes may belong to a first cell of multiple cells included in the WLAN and the other nodes may include at least one node from a second cell from among the multiple cells.

In some examples for the example second apparatus, the generate component may determine that data has become available after at least a first portion of the dummy payload has been transmitted by the transmit component and replace a second portion of the dummy payload awaiting transmission with a third header associated with the available data and a third data payload including at least some of the available data. For these examples, the transmit component may then transmit the second portion to the source node that includes the third header and the third data payload.

According to some examples for the example second apparatus, the destination node, the source node and other nodes in the WLAN may be capable of implementing carrier sense multiple access (CSMA) for transmitting packets via the WLAN and the first portion of the dummy payload, the third header, and the third data payload may indicate to the other nodes in the WLAN a communication link is being used by the source node for a given time associated with the source node transmitting the packet to the destination node.

In some examples for the example second apparatus, the WLAN may be capable of operating in compliance with one or more wireless communication standards or specifications associated with Institute of Electrical and Electronic Engineers (IEEE) 802.11 standards.

According to some examples for the example second apparatus, the destination node may be an access point and the source node may be a termination node.

In some examples, example second methods implemented at a destination node in a WLAN may include receiving, at the destination node, a packet including a first header and a first data payload from a source node in the WLAN. The example second methods may also include generating an implicit ACK packet having a second header. The implicit ACK packet may also include either a dummy payload if no data is awaiting transmission to the source node or a second data payload if data is awaiting transmission to the source node. The example second methods may also include transmitting the implicit ACK packet to the source node following successful decoding of the first header and concurrent with receiving and decoding the first data payload included in the packet received from the source node.

According to some examples for the example second methods, the destination node, the source node and other nodes in the WLAN may be capable of implementing carrier sense multiple access (CSMA) for transmitting packets via the WLAN and the dummy payload or the second data payload to indicate to the other nodes in the WLAN a communication link is being used by the source node for a given time associated with the source node transmitting the packet to the destination node.

In some examples for the example second methods, the destination and the source nodes may belong to a first cell of multiple cells included in the WLAN and the other nodes may include at least one node from a second cell from among the multiple cells.

According to some examples, the example second methods may also include determining that data has become available after at least a first portion of the dummy payload has been transmitted and replacing a second portion of the dummy payload awaiting transmission with a third header associated with the available data and a third data payload including at least some of the available data. The example second methods may also include transmitting the second portion to source node.

In some examples for the example second methods, the destination node, the source node and other nodes in the WLAN may be capable of implementing carrier sense multiple access (CSMA) for transmitting packets via the WLAN and the first portion of the dummy payload, the third header, and the third payload to indicate to the other nodes in the WLAN a communication link is being used by the source node for a given time associated with the source node transmitting the packet to the destination node.

According to some examples for the example second methods, the WLAN may be capable of operating in compliance with one or more wireless communication standards or specifications associated with the IEEE 802.11 standards.

In some examples for the example second methods, the destination node may be an access point and the source node may be a termination node.

In some examples, a second at least one machine readable medium comprising a plurality of instructions that in response to being executed on a system at a destination node in a WLAN may cause the system to receive a packet including a first header and a first data payload from a source node in the WLAN. The instructions may also cause the instruction to generate an implicit ACK packet having a second header. The implicit ACK packet may include a dummy payload if no data is awaiting transmission to the source node. The instructions may also cause the system to transmit the implicit ACK packet to the source node following successful decoding of the first header and concurrent with receiving and decoding the first data payload included in the packet received from the source node.

According to some examples for the second at least one machine readable medium, the destination node, the source node and other nodes in the WLAN may be capable of implementing carrier sense multiple access (CSMA) for transmitting packets via the WLAN and the dummy payload to indicate to the other nodes in the WLAN a communication link is being used by the source node for a given time associated with the source node transmitting the packet to the destination node.

In some examples for the second at least one machine readable medium, the destination and the source nodes may belong to a first cell of multiple cells included in the WLAN and the other nodes may include at least one node from a second cell from among the multiple cells.

According to some examples for the second at least one machine readable medium, the instructions to also cause the system to determine that data has become available after at least a first portion of the dummy payload has been transmitted. The instructions may also cause the system to replace a second portion of the dummy payload awaiting transmission with a third header associated with the available data and a second data payload including at least some of the available data and transmit the second portion to the source node that includes the third header and the second data payload.

In some examples for the second at least one machine readable medium, the destination node, the source node and other nodes in the WLAN may be capable of implementing carrier sense multiple access (CSMA) for transmitting packets via the WLAN and the first portion of the dummy payload, the third header, and the second data payload to indicate to the other nodes in the WLAN a communication link is being used by the source node for a given time associated with the source node transmitting the packet to the destination node.

According to some examples for the second at least one machine readable medium, the WLAN may be capable of operating in compliance with one or more wireless communication standards or specifications associated with IEEE 802.11 standards.

In some examples for the second at least one machine readable medium, the destination node may be an access point and the source node may be a termination node.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," " "second," "third," and so forth, are used merely as labels, and are not intended to impose numerical requirements on their objects.

What is claimed is:

1. An apparatus for a source node in a wireless local area network (WLAN) comprising:
   circuitry;
   a transmit component for execution by the circuitry to transmit a packet having a first header and a first data payload to a destination node in the WLAN;
   a receive component for execution by the circuitry, the receive component to wait for receipt of an implicit acknowledgement (ACK) packet having a second header from the destination node, the implicit ACK packet to indicate receipt of at least the first header by the destination node; and
   a stop component for execution by the circuitry to cause the transmit component to stop transmission of any remaining portion of the first data payload awaiting transmission when the stop component has determined that the second header for the implicit ACK packet has not been received within a defined time interval.

2. The apparatus of claim 1, comprising:
   one or more antennas; and a simultaneous transmit and receive (STR) component coupled to the one or more antennas, the STR component for execution by the circuitry to enable the transmit component to transmit at least portions of the packet to the destination node while the receive component receives the implicit ACK packet from the destination node.

3. The apparatus of claim 1, receipt of the implicit ACK packet by the receive component comprises the receive component capable of receiving and successfully decoding at least the second header and determining that the implicit ACK packet was transmitted from the destination node.

4. The apparatus of claim 3, the defined time comprising a given time interval associated with the receive component receiving and successfully decoding at least the second header.

5. The apparatus of claim 1, comprising the source node, the destination node and other nodes in the WLAN capable of implementing carrier sense multiple access (CSMA) for transmitting packets via the WLAN, the implicit ACK packet also having a dummy payload, the implicit ACK packet having the dummy payload to indicate to the other nodes in the WLAN a communication link is being used by the source node for a given time associated with the transmit component transmitting the packet to the destination node.

6. The apparatus of claim 5, comprising the stop component to cause the transmit component to stop transmission of any remaining portion of the first data payload awaiting transmission if the stop component has determined that at least a portion of the dummy payload has not been received and successfully decoded by the receive component.

7. The apparatus of claim 1, comprising the source node, the destination node and other nodes in the WLAN capable of implementing carrier sense multiple access (CSMA) for transmitting packets via the WLAN, the implicit ACK packet also having a second data payload including data destined for the source node, the implicit ACK packet having the second data payload to indicate to the other nodes in the WLAN a communication link is being used by the source node for a given time associated with the transmit component transmitting the packet to the destination node.

8. The apparatus of claim 7, comprising the stop component to cause the transmit component to stop transmission of any remaining portion of the first data payload awaiting transmission if the stop component has determined that at least a portion of the second data payload has not been received and successfully decoded by the receive component.

9. A method implemented at a source node in a wireless local area network (WLAN) comprising:
transmitting, at the source node, a packet having a first header and a first data payload to a destination node in the WLAN;
continuing to transmit the first data payload to the destination node based on whether at least a second header for an implicit acknowledgement (ACK) packet has been received from the destination node to indicate receipt of at least the first header by the destination node; and
stopping transmission of a remaining portion of the first data payload awaiting transmission when the second header for the implicit ACK packet has not been received within a defined time interval.

10. The method of claim 9, comprising successfully decoding at least the second header comprises determining that the implicit ACK packet was transmitted from the destination node and wherein the defined time interval is associated with a given time interval for the source node to make the determining.

11. The method of claim 9, comprising the source node, the destination node and other nodes in the WLAN capable of implementing carrier sense multiple access (CSMA) for transmitting packets via the WLAN, the implicit ACK packet also having a dummy payload, the implicit ACK packet having the dummy payload to indicate to the other nodes in the WLAN a communication link is being used by the source node for a given time associated with the source node transmitting the packet to the destination node.

12. The method of claim 11, comprising the source and the destination nodes belonging to a first cell of multiple cells included in the WLAN and the other nodes including at least one node from a second cell from among the multiple cells.

13. The method of claim 9, comprising the source node, the destination node and other nodes in the WLAN capable of implementing carrier sense multiple access (CSMA) for transmitting packets via the WLAN, the implicit ACK packet also having a second data payload including data destined for the source node, the implicit ACK packet having the second data payload to indicate to the other nodes in the WLAN a communication link is being used by the source node for a given time associated with the source node transmitting the packet to the destination node.

14. The method of claim 13, comprising the source and the destination nodes belonging to a first cell of multiple cells included in the WLAN and the other nodes including at least one node from a second cell from among the multiple cells.

15. The method of claim 9, comprising the source node, the destination node and other nodes in the WLAN capable of implementing carrier sense multiple access (CSMA) for transmitting packets via the WLAN, the implicit ACK packet also having a combination of a dummy payload and a second data payload including data destined for the source node, the implicit ACK packet having the combination of the dummy payload and the second data payload to indicate to the other nodes in the WLAN a communication link is being used by the source node for a given time associated with the source node transmitting the packet to the destination node.

16. The method of claim 15, comprising the source and the destination nodes belonging to a first cell of multiple cells included in the WLAN and the other nodes including at least one node from a second cell from among the multiple cells.

17. The method of claim 9, comprising the WLAN capable of operating in compliance with one or more wireless communication standards or specifications associated with the Institute of Electrical and Electronic Engineers (IEEE) 802.11 standards.

18. The method of claim 17, comprising the source node is a terminal node and the destination node is an access point.

* * * * *